March 11, 1947. A. N. HAYES 2,417,301
PROCESS AND APPARATUS FOR PRODUCING LIGHT WEIGHT SLAG
Filed March 1, 1944 2 Sheets-Sheet 1

ALBERT N. HAYES
INVENTOR
BY *Henry L. Jennings*
ATTORNEY

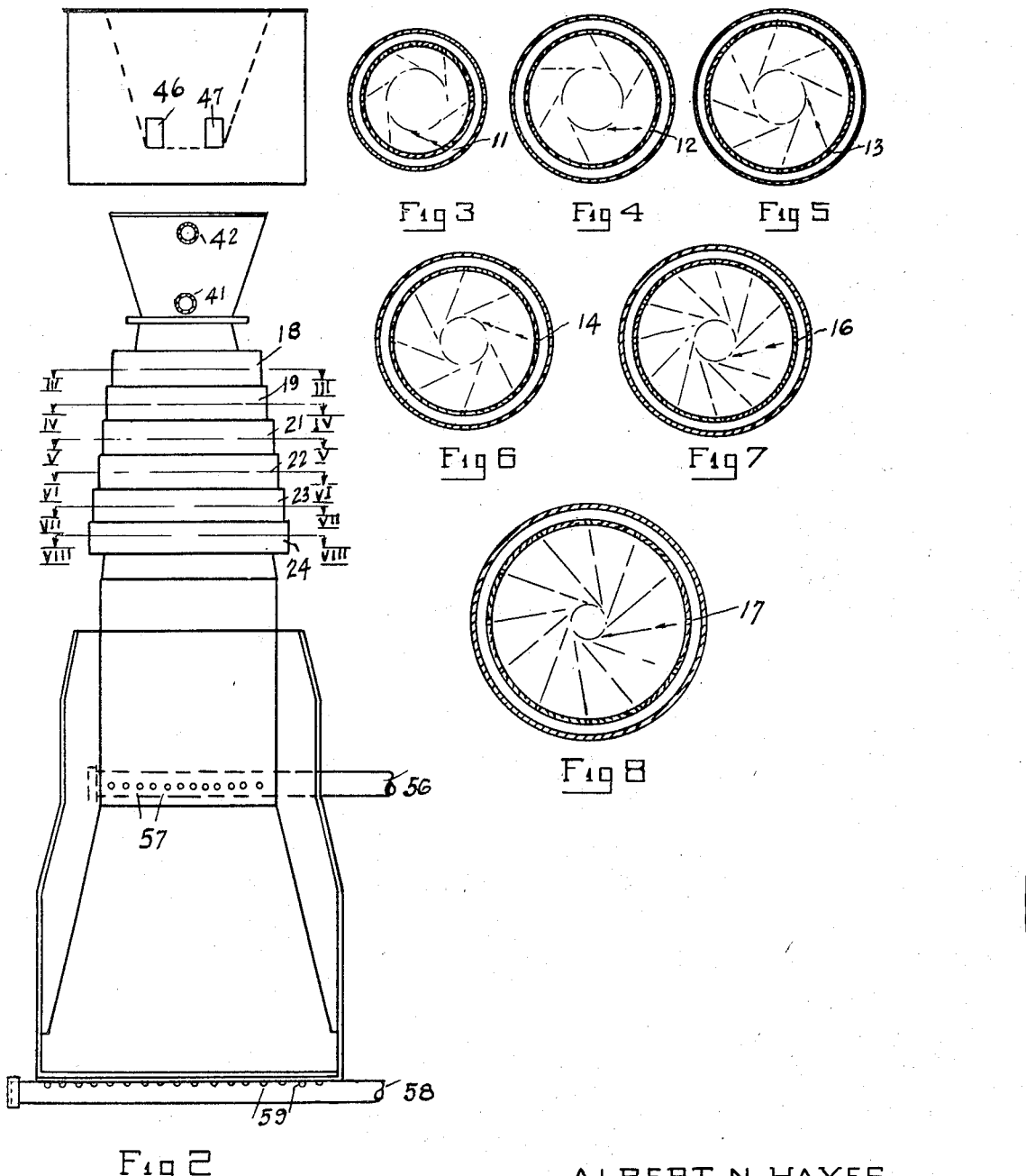

Patented Mar. 11, 1947

2,417,301

UNITED STATES PATENT OFFICE 2,417,301

PROCESS AND APPARATUS FOR PRODUCING LIGHTWEIGHT SLAG

Albert N. Hayes, Birmingham, Ala., assignor to G. C. McCullough

Application March 1, 1944, Serial No. 524,561

15 Claims. (Cl. 18—2.5)

This invention relates to the processing of molten slag to produce a relatively light weight cellular product having great strength and hardness. One of the objects of my invention is to provide a method and apparatus of the character designated which shall effectively disintegrate the slag while in a molten condition without the use of moving parts.

A further object of my invention is to provide a process and apparatus for producing light weight cellular slag of substantially the same density as water granulated slag, with many times the strength thereof, and which shall be delivered from the apparatus dry.

A more specific object of my invention is to provide a process in which molten slag and water is cascaded through high velocity whirling currents of an elastic fluid such as steam and in which the slag is thoroughly disintegrated and commingled with the water, air and steam to provide the desired cellular structure.

Briefly my invention consists in cascading molten slag and water through high velocity whirls of steam or air which mechanically disintegrate the slag, while the water and air granulates and gives it its cellular structure. The whirls of steam rotate substantially horizontally and preferably, in descending sequence, alternately in opposite directions. By regulating the amount of water fed in with the molten slag, the size of the particles of the final product may be regulated.

The apparatus in which my improved process is carried out comprises a vertically disposed frusto-conical disintegrating chamber into which molten slag is fed at the upper end. A plurality of series of steam nozzles are disposed in horizontal rows around the disintegrating chamber and are directed inwardly of the chamber at acute angles to the radial, successive pairs of rows being directed alternately in opposite directions. Steam or air at relatively high pressure, that is from 100 to 200 lbs. per sq. in., is supplied to the nozzles to form whirls that rotate at a very high velocity, the successive whirls rotating in opposite directions to disintegrate the slag thoroughly and mix it with the water. To better insure disintegration and mixing of the slag with water, I feed the slag into the disintegrator near the sides, and provide means to direct the water introduced with the slag along the wall of the chamber. As the slag falls from the disintegrating chamber it is still hot and all of the water introduced with it has not yet been evaporated. To completely granulate the slag, it is allowed to fall into a downwardly inclined trough at the upper end of which is disposed a steam pipe having a plurality of openings therein directed downwardly of the trough which serve to thoroughly mix the hot slag and water to complete the cooling and granulation of the slag and evaporation of the water. Similarly, a steam pipe having upwardly directed openings therein is disposed at the lower end of the troughs and functions to blow the slag and water upwardly for its final cooling and evaporation of the water.

Apparatus embodying features of my invention is illustrated in the accompanying drawings forming a part of this application in which Fig. 1 is a vertical sectional view of the apparatus;

Fig. 2 is an end elevational view of the same;

Fig. 3 is a sectional view taken along the line III—III of Fig. 2;

Fig. 4 is a sectional view taken along the line IV—IV of Fig. 2;

Fig. 5 is a sectional view taken along the line V—V of Fig. 2;

Fig. 6 is a sectional view taken along the line VI—VI of Fig. 2;

Fig. 7 is a sectional view taken along the line VII—VII of Fig. 2; and

Fig. 8 is a sectional view taken along the line VIII—VIII of Fig. 2.

Figure 1:
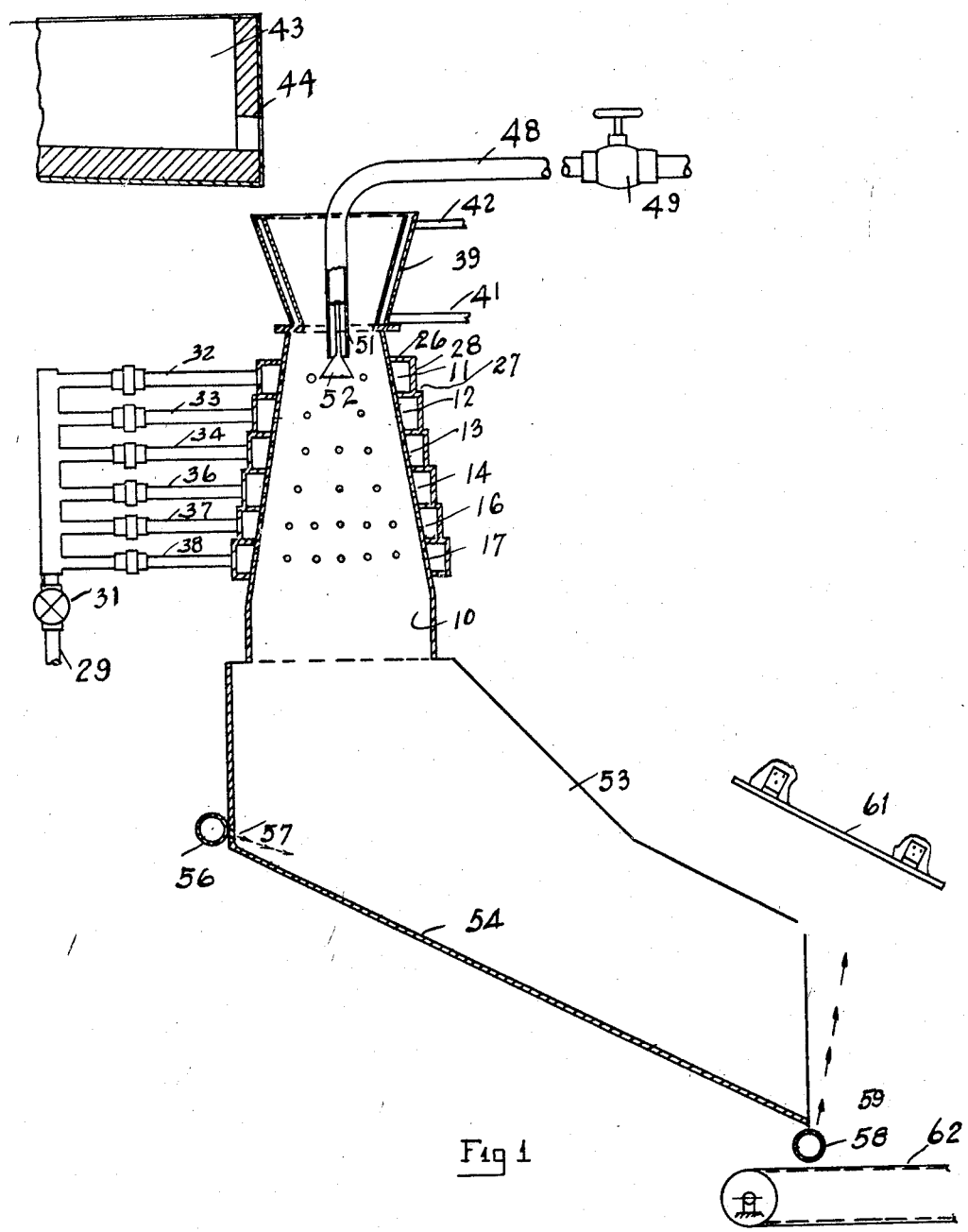

Referring to the drawings, my improved apparatus comprises a vertically disposed disintegrating chamber 10 which is preferably frusto-conical in shape to compensate for the increased volume of the slag as it is disintegrated. Disposed around the disintegrating chamber are successive rows of nozzles 11, 12, 13, 14, 16 and 17 which are directed inwardly in a direction inclined to the radial as shown in Figs. 3 to 8 inclusive. It will be seen by reference to Figs. 3 to 8 that the nozzles 11 and 12 are directed clockwise around the disintegrating chamber, the nozzles 13 and 14 are directed counterclockwise therearound, and the nozzles 16 and 17 are directed clockwise so that steam supplied to said nozzles produces horizontal whirls rotating alternately in opposite directions. It will also be seen by reference to Figs. 3 to 8 that the nozzles are so directed as to provide whirls of progressively increasing outer diameter and decreasing inner diameter, or region of relative quiet, from the upper end of the chamber downwards. This feature compensates for the increase in volume of the slag as it is disintegrated.

Steam is supplied to the nozzles through manifolds, or bustle pipes 18, 19, 21, 22, 23 and 24 respectively. While air may be employed for the purpose, steam is more economical. The manifolds may be made economically as shown in Fig. 1 by successive disks such as 26 and 27 provided with openings to fit over the disintegrating chamber and joined together by rings 28, welded at top and bottom to the disks. Steam is supplied to the manifold from a supply line 29 having a regulating valve 31 therein. Preferably the steam is at a relatively high pressure, say from 100 to 200 lbs. per sq. in. to insure thorough disintegration of the slag. Branch conduits 32, 33, 34, 36, 37 and 38 connect the supply line 29 with the manifolds.

Mounted on top of the disintegrating chamber 10 is a water cooled feed hopper 39, the same being formed with double walls and the space between the walls being connected to a cold water supply through conduits 41 and 42. Molten slag is fed into the hopper 39 from a trough 43 having an end wall 44 in which is formed side openings 46 and 47 so that the slag falls in two streams along the sides of the hopper 39 and spreads in sheets to fall into the disintegrating chamber where it is engaged by the high velocity steam whirls previously described. Water is fed into the disintegrating chamber along with the slag from a water supply line 48 provided with a regulating valve 49 and terminating near the top of the disintegrating chamber as shown at 51. At the mouth of the water supply line is a bell or diffuser 52 which causes the water to be thrown to the sides of the disintegrating chamber to encounter the slag and the steam whirls and be thoroughly mixed therewith. It is contemplated that the water supply will be at a pressure usually found in city mains which is around 70 lbs. per sq. inch.

Mounted beneath the disintegrating chamber 10 is a receiving trough 53 having an inclined bottom 54 and into which the slag and unevaporated water fall from the disintegrating chamber. At this point in the process, the slag is still hot but is not in a molten condition, and is of a size such as usually employed as aggregate in concrete mixtures. Also, a part of the water introduced with the slag has not yet been evaporated. In order to granulate the slag I provide a steam supply pipe 56 at the upper end of the trough having spaced holes 57 therein directed downwardly of the trough. Steam introduced into the pipe 56 should be at sufficient pressure to lift the slag and water and thoroughly mix the same. This action granulates the slag and evaporates the water. Likewise at the lower end of the trough 54 I provide a steam supply pipe 58 having a plurality of upwardly directed holes 59 therein which lift the slag and water upwardly, blowing it against a baffle 61 mounted over the lower end of the trough. In this manner it is finally cooled sufficiently to handle without sticking. The completely processed slag falls on a suitable conveyor 62 to be delivered away from the apparatus. The steam lines 56 and 58 are preferably around two inches in diameter and are provided with holes $\frac{3}{16}$ inch in diameter and spaced around 1½ inches apart to provide a clean sweep of the slag and water in the trough 53.

In the carrying out of my improved process I have found that by regulating the amount of water supplied through the water supply line 48, I can control the size of the particles of finished slag; the larger the amount of water supplied, the smaller the particles. I can thus produce a hard uniform product which is of superior qualities for all purposes. Slag granulated according to my improved process is especially valuable for the making of puzzolan type cements.

I have observed in the operation of my improved apparatus that a partial vacuum forms at the upper end of the disintegrating chamber which draws a large amount of air down with the slag and water for mixture with the slag and I am of the opinion that this feature is an important factor in the production of the improved product heretofore described. It also is important in providing a safe operation in that molten slag is never thrown out of the top of the apparatus during its operation, to endanger the workmen.

It will accordingly be apparent that I have produced an improved process and apparatus for the production of relatively light weight cellular slag which is simple and reliable of operation and which involves no moving parts subject to wear.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. Apparatus for producing relatively light weight cellular slag comprising a vertically disposed tubular disintegrating chamber open at both ends, a wall for the chamber and having a plurality of rows of horizontally directed nozzles therein for admitting steam into the chamber, said nozzles being disposed to provide a plurality of high velocity vortical whirls of steam in vertically spaced planes in the chamber, means to supply steam under pressure to the nozzles, and means to cascade molten slag and water into the upper end of the chamber through the steam whirls.

2. Apparatus for producing relatively light weight cellular slag comprising a vertically disposed tubular disintegrating chamber, a wall for the chamber and having a plurality of rows of nozzles therein for admitting steam into the chamber, said nozzles being disposed to provide a plurality of high velocity vortical whirls of steam in vertically spaced planes in the chamber, the alternate whirls from the top downward rotating in opposite directions, means to supply steam under pressure to the nozzles, and means to cascade molten slag and water into the chamber through the steam whirls.

3. In apparatus for producing relatively light weight cellular slag, a vertically disposed frusto-conical disintegrating chamber open at both ends having a series of vertically spaced rows of steam nozzles extending through the wall thereof and directed horizontally inwardly of the chamber at an angle to the radial and tangent to imaginary circles within the chamber to produce a series of high velocity vortical whirls of steam in the chamber, means to cascade molten slag and water downwardly through said whirls, and manifolds surrounding the chamber to supply high pressure steam to the nozzles.

4. In apparatus for producing relatively light weight cellular slag, a vertically disposed frusto-conical disintegrating chamber having a series of vertically spaced rows of steam nozzles extending through the wall thereof and directed inwardly of the chamber at an angle to the radial and tangent to imaginary circles within the chamber to produce a series of high velocity vortical whirls of steam rotating in vertically spaced planes in the chamber, the alternate whirls rotating in opposite directions, a manifold around each of the rows of steam nozzles, means to supply the manifolds with high pressure steam, and means to feed molten slag and water into the upper end of the chamber to fall freely down through the said whirls.

5. In apparatus for producing relatively light weight cellular slag, a vertically disposed frustoconical disintegrating chamber having a series of rows of steam nozzles extending through the wall thereof and directed inwardly of the chamber at an angle to the radial to produce a series of high velocity whirls of steam in the chamber, the alternate whirls rotating in opposite directions and being successively of lesser inner diameter from the upper end of the chamber downwardly, a manifold around each of the rows of steam nozzles for supplying high pressure thereto, means to cascade molten slag downwardly through the chamber near the wall thereof, and means to direct a stream of water along the wall of the chamber to mix with the steam and slag.

6. In apparatus for producing relatively light weight cellular slag, a vertically disposed frustoconical disintegrating chamber having a series of rows of steam nozzles extending through the wall thereof and directed inwardly of the chamber at an angle to the radial to produce a series of high velocity whirls of steam in the chamber, the alternate whirls rotating in opposite directions and being successively of lesser inner diameter from the upper end of the chamber downwardly, a manifold around each of the rows of steam nozzles for supplying high pressure steam thereto, means to cascade molten slag downwardly through the chamber near the wall thereof, and means to direct a stream of water along the wall of the chamber to mix with the steam and slag, a downwardly inclined trough disposed beneath the disintegrating chamber, and steam nozzles in the trough for blowing the disintegrated slag down the trough as it falls from the chamber and discharge it from the apparatus.

7. In apparatus for granulating slag, a vertically disposed tubular chamber open at both ends having a wall with a plurality of vertically spaced series of nozzles therethrough disposed at successive levels around the chamber, and directed horizontally inwardly of the chamber tangential to successive circles smaller in diameter than the chamber, means to supply steam under pressure to the nozzles, means to feed molten slag into the upper part of the chamber to fall by gravity downwardly therethrough and means to supply cooling water in the upper part of the chamber in a stream directed toward the wall thereof.

8. The method of granulating slag which comprises subjecting falling molten slag in a confined path successively to high velocity vortical whirls of steam, rotating in vertically spaced planes and simultaneously cooling the slag with water.

9. The process of forming light weight slag which comprises continuously feeding molten slag and water in a freely falling manner in a confined path through a plurality of vortical whirls of steam disposed to produce whirls of the materials rotating in vertically spaced planes alternately in opposite directions.

10. The process of forming light weight slag which comprises continuously feeding molten slag and water in a freely falling manner in a confined path through a plurality of jets of steam disposed to produce vortical whirls of the materials rotating in vertically spaced planes first in one direction and then in the other.

11. The process of producing light weight slag which comprises cascading molten slag and water in a confined path through high velocity vortical whirls of steam which increase successively in diameter downwardly and rotate alternately in opposite directions in vertically spaced substantially horizontal planes.

12. The process of producing light weight slag which comprises cascading molten slag and water in a confined path through high velocity vortical whirls of steam which increase successively in diameter downwardly and rotate alternately in opposite directions in vertically spaced substantially horizontal planes, and inducing a down flow of air through the whirls of steam with the slag and water.

13. The process of producing light weight granulated slag which comprises cascading molten slag and water in a confined path through high velocity vortical whirls of steam rotating in vertically spaced substantially horizontal planes alternately in opposite directions, and blowing the thus treated slag and water through the air for final cooling and granulation.

14. The process of producing light weight granulated slag which comprises cascading molten slag and water in a confined path through high velocity vortical whirls of steam rotating in vertically spaced substantially horizontal planes alternately in opposite directions, and then subjecting the thus falling slag and water to jets of steam to blow the mixture into the air for final cooling and granulation of the slag.

15. The process of producing light weight granulated slag which comprises cascading molten slag and water in a confined path through high velocity vortical whirls of steam rotating in vertically spaced substantially horizontal planes alternately in opposite directions, inducing a downflow of air with the molten slag and water, and at the lower end of the confined path subjecting the thus downwardly moving mixture to jets of steam to blow it into the air and effect final cooling and granulation of the slag.

ALBERT N. HAYES.

REFERENCES CITED

The following references are of record in the file of this patent:

UNITED STATES PATENTS

| Number | Name | Date |
| --- | --- | --- |
| 2,317,895 | Drill | Apr. 27, 1943 |
| 2,151,079 | Bowen | Mar. 21, 1939 |
| 2,032,827 | Andrews | Mar. 3, 1936 |
| 1,699,575 | Spies | Jan. 22, 1929 |

FOREIGN PATENTS

| Number | Country | Date |
| --- | --- | --- |
| 432,191 | British | 1933 |